(12) United States Patent
Aoki

(10) Patent No.: US 9,944,184 B2
(45) Date of Patent: Apr. 17, 2018

(54) CONTROL DEVICE FOR VEHICLE

(71) Applicant: TOYOTA JIDOSHA KABUSHIKI KAISHA, Toyota-shi, Aichi-ken (JP)

(72) Inventor: Kazutaka Aoki, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 216 days.

(21) Appl. No.: 14/861,284

(22) Filed: Sep. 22, 2015

(65) Prior Publication Data

US 2016/0082841 A1 Mar. 24, 2016

(30) Foreign Application Priority Data

Sep. 24, 2014 (JP) ................................. 2014-194324

(51) Int. Cl.
*B60L 3/00* (2006.01)
*B60L 3/12* (2006.01)
*B60L 15/20* (2006.01)

(52) U.S. Cl.
CPC ............... *B60L 3/0061* (2013.01); *B60L 3/12* (2013.01); *B60L 15/2054* (2013.01); *Y02T 10/6221* (2013.01); *Y02T 10/644* (2013.01); *Y02T 10/7077* (2013.01); *Y02T 10/7275* (2013.01)

(58) Field of Classification Search
CPC .................................................... B60L 3/0069
See application file for complete search history.

(56) References Cited

U.S. PATENT DOCUMENTS

| 2007/0093359 A1* | 4/2007 | Kobayashi ............... B60K 6/48 477/107 |
| 2008/0254935 A1 | 10/2008 | Kasuga et al. |
| 2011/0089883 A1* | 4/2011 | Anwar ................. G01R 31/343 318/490 |
| 2011/0232980 A1 | 9/2011 | Nomura et al. |
| 2011/0307130 A1* | 12/2011 | Gow .................. B60G 17/0195 701/22 |

(Continued)

FOREIGN PATENT DOCUMENTS

| JP | 0680048 A | 3/1994 |
| JP | 2008149966 A | 7/2008 |
| JP | 2008260466 A | 10/2008 |

(Continued)

*Primary Examiner* — Todd Melton
*Assistant Examiner* — Jason R Roberson
(74) *Attorney, Agent, or Firm* — Sughrue Mion, PLLC

(57) ABSTRACT

A control device for a vehicle capable of transmitting power of a rotating electrical machine to a driving wheel by a shift of a transmission, includes: an electronic control unit configured to (i) select, as an operation mode of the rotating electrical machine, a normal mode and a power mode in which the rotating electrical machine is operated such that a vehicle drive force is increased more than the normal mode, (ii) execute insulation protection control of the rotating electrical machine when the electronic control unit determines that dielectric breakdown of the rotating electrical machine occurs, and (iii) set a priority of the insulation protection control in an order of a change in a transmission gear ratio of the transmission, a decrease in an application voltage to the rotating electrical machine, and torque limitation of the rotating electrical machine in a state where the power mode is selected.

5 Claims, 6 Drawing Sheets

(56) References Cited

U.S. PATENT DOCUMENTS

2013/0033214 A1* 2/2013 Obata ................ G01R 31/1227
 318/490
2014/0139150 A1* 5/2014 Morisaki ................ B60L 15/20
 318/139

FOREIGN PATENT DOCUMENTS

| JP | 2009255916 A | 11/2009 |
|----|--------------|---------|
| JP | 2011201370 A | 10/2011 |
| JP | 2013-062890 A | 4/2013 |
| JP | 2013245953 A | 12/2013 |
| JP | 2014-050174 A | 3/2014 |
| JP | 2014-082855 A | 5/2014 |

\* cited by examiner

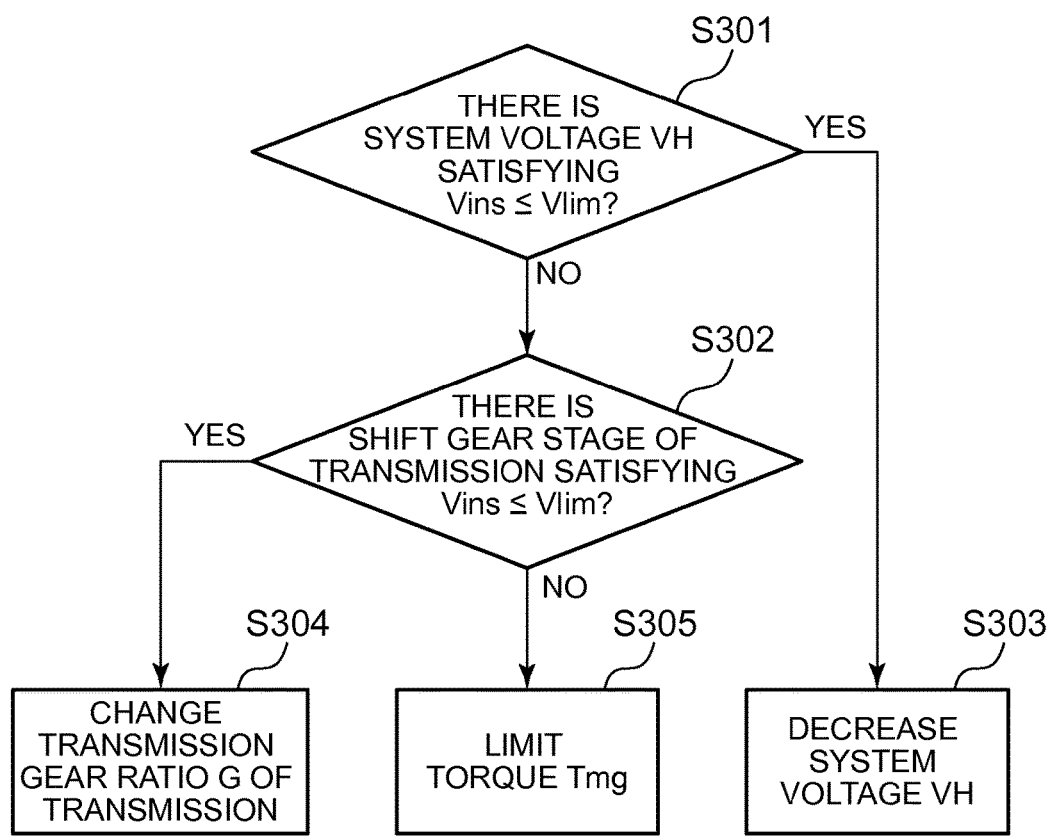

CONTROL DEVICE FOR VEHICLE

INCORPORATION BY REFERENCE

The disclosure of Japanese Patent Application No. 2014-194324 filed on Sep. 24, 2014 including the specification, drawings and abstract is incorporated herein by reference in its entirety.

BACKGROUND OF THE INVENTION

1. Field of the Invention

The present invention relates to a control device for a vehicle capable of transmitting power of a rotating electrical machine to a driving wheel by the shift of a transmission.

2. Description of Related Art

In Japanese Patent Application Publication No. 2013-62890 (JP 2013-62890 A), when a rotating electrical machine is driven in a region where a surge voltage applied to the rotating electrical machine becomes high, an input voltage to an inverter is decreased, thereby suppressing dielectric breakdown of the rotating electrical machine.

In JP 2013-62890 A, in order to suppress dielectric breakdown of the rotating electrical machine, the application voltage to the rotating electrical machine is decreased. However, if the application voltage to the rotating electrical machine is decreased, since the maximum torque to be generated by the rotating electrical machine is decreased, power performance of the vehicle is degraded. In particular, under operation conditions in which a great vehicle drive force is required, it is undesirable that power performance of the vehicle is degraded.

SUMMARY OF THE INVENTION

The invention provides a control device for a vehicle capable of suppressing dielectric breakdown of a rotating electrical machine while suppressing degradation of power performance of the vehicle.

A first aspect of the invention is a control device for a vehicle capable of transmitting power of a rotating electrical machine to a driving wheel by the shift of a transmission. The control device includes an electronic control unit. The electronic control unit is configured to select, as an operation mode of the rotating electrical machine, a normal mode and a power mode in which the rotating electrical machine is operated such that a vehicle drive force is increased more than the normal mode. The electronic control unit is configured to execute insulation protection control of the rotating electrical machine when it is determined that dielectric breakdown of the rotating electrical machine occurs. The electronic control unit is configured to set the priority of the insulation protection control in the order of a change in a transmission gear ratio of the transmission, a decrease in an application voltage to the rotating electrical machine, and torque limitation of the rotating electrical machine in a state where the power mode is selected as the operation mode.

In the above-described aspect, at the time of executing the insulation protection control in a state when the power mode is selected as the operation mode, the electronic control unit may be configured to (i) change the transmission gear ratio of the transmission as the insulation protection control when the electronic control unit determines that the occurrence of dielectric breakdown is prevented by a change in the transmission gear ratio of the transmission, (ii) decrease the application voltage to the rotating electrical machine as the insulation protection control when the electronic control unit determines that dielectric breakdown occurs even if the transmission gear ratio of the transmission is changed and the occurrence of dielectric breakdown is prevented by a decrease in the application voltage to the rotating electrical machine, and (iii) limit torque of the rotating electrical machine as the insulation protection control when the electronic control unit determines that dielectric breakdown occurs even if the application voltage to the rotating electrical machine is decreased.

In the above-described aspect, the electronic control unit may be configured to further select, as the operation mode of the rotating electrical machine, an economy mode in which the rotating electrical machine is operated such that energy consumption at the time of driving of the vehicle is decreased more than the normal mode, and the electronic control unit may be configured to set the priority of the insulation protection control in the order of a decrease in the application voltage to the rotating electrical machine and torque limitation of the rotating electrical machine in a state where the economy mode is selected as the operation mode.

In the above-described aspect, the electronic control unit may be configured to determine the occurrence of dielectric breakdown of the rotating electrical machine based on the application voltage to the rotating electrical machine and the rotation speed and torque of the rotating electrical machine.

In the above-described aspect, the electronic control unit may be configured to (i) estimate the potential difference between insulating parts of the rotating electrical machine based on the application voltage to the rotating electrical machine and the rotation speed and torque of the rotating electrical machine, and (ii) compare the potential difference with a set value to determine whether or not dielectric breakdown occurs in the rotating electrical machine.

In the above-described aspect, the electronic control unit may be configured to set the set value based on an atmospheric pressure around the rotating electrical machine and the temperature of the rotating electrical machine.

According to the above-described aspect of the invention, at the time of executing insulation protection control of the rotating electrical machine in the power mode, a change in the transmission gear ratio of the transmission is performed with priority over a decrease in the application voltage to the rotating electrical machine, whereby it is possible to suppress dielectric breakdown of the rotating electrical machine while suppressing degradation of power performance of the vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 9 is a flowchart illustrating processing which is executed by the electronic control device when it is determined that dielectric breakdown occurs in a state where a normal mode is selected.

DETAILED DESCRIPTION OF EMBODIMENTS

Figure 1:
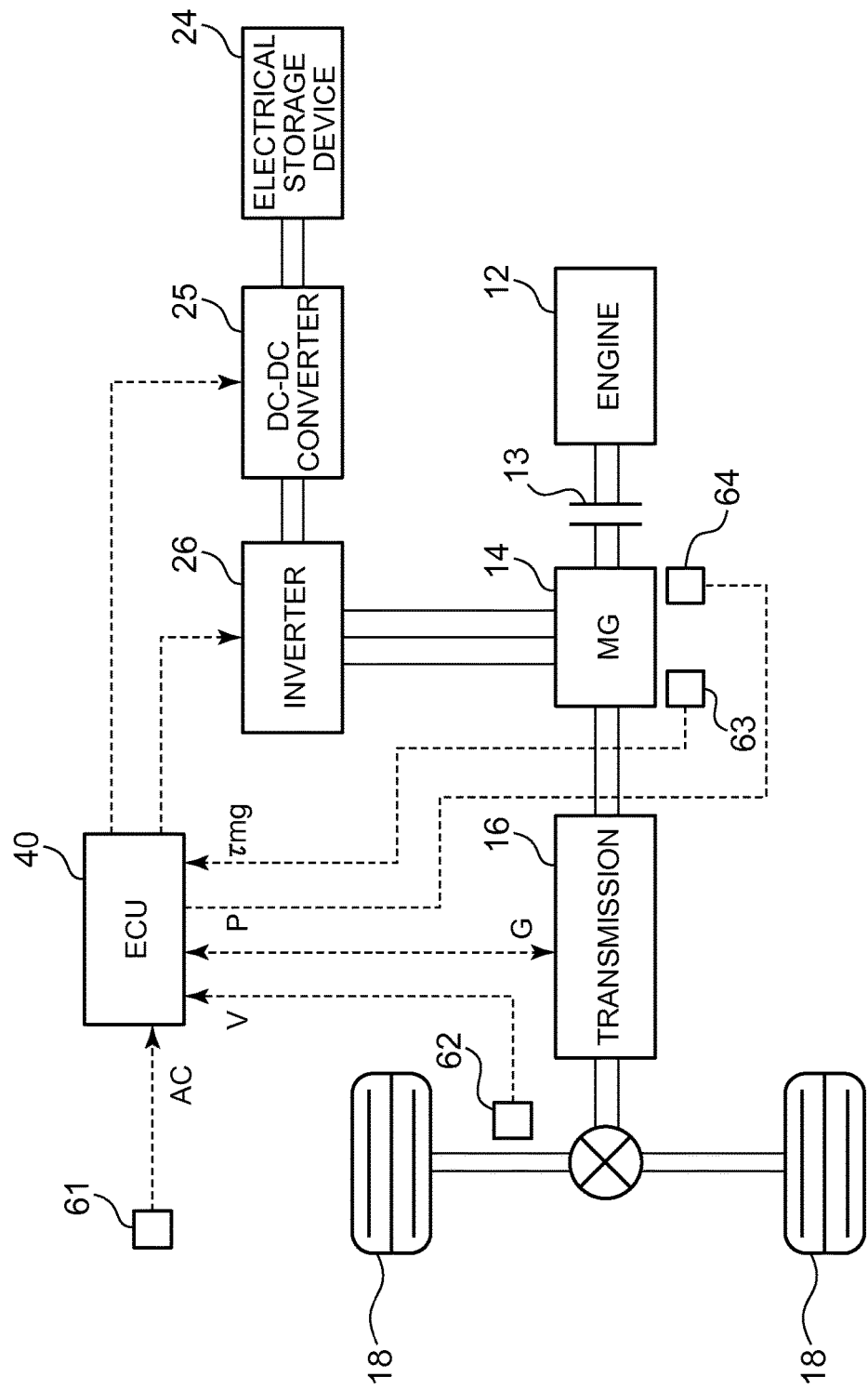
FIG. 1 is a diagram showing a configuration example of a hybrid vehicle including a control device according to an embodiment of the invention.

Hereinafter, a mode (hereinafter, referred to as an embodiment) for carrying out the invention will be described referring to the drawings.

FIG. 1 is a diagram showing a configuration example of a hybrid vehicle including a control device according to the embodiment of the invention. A clutch 13 is provided between an engine 12 and a motor generator (rotating electrical machine) 14, and the motor generator 14 is coupled to driving wheels 18 through a transmission 16. As the transmission 16, a stepped variable transmission capable of changing a transmission gear ratio G in a stepwise manner can be used. At the time of the engagement of the clutch 13, power generated by the engine 12 can be transmitted to the driving wheels 18 by the shift of the transmission 16, and traveling of the vehicle can be performed using power of the engine 12. In addition, power by powering operation of the motor generator 14 can be transmitted to the driving wheels 18 by the shift of the transmission 16, and traveling of the vehicle can be performed using power of the motor generator 14. At the time of powering operation of the motor generator 14, DC electric power from an electrical storage device 24 is boosted with a DC-DC converter 25, DC electric power from the DC-DC converter 25 is converted to an alternating current (for example, three-phase alternating current) with an inverter 26, and the alternating current is supplied to a coil of the motor generator 14. A power generation operation of the motor generator 14 can be performed using power of the driving wheels 18 or the engine 12. At the time of the power generation operation of the motor generator 14, AC electric power of the coil of the motor generator 14 is converted to a direct current with the inverter 26, and DC electric power from the inverter 26 is boosted with DC-DC converter 25 and charges the electrical storage device 24.

A signal indicating an accelerator opening (the amount of depression of an accelerator pedal) AC detected by an accelerator opening sensor 61, a signal indicating a vehicle speed V detected by a vehicle speed sensor 62, a signal indicating a temperature τmg of the motor generator 14 detected by the temperature sensor 63, and a signal indicating an atmospheric pressure P around the motor generator 14 detected by an atmospheric pressure sensor 64 are input to an electronic control device (ECU) 40. The electronic control device 40 controls the transmission gear ratio G of the transmission 16 and switch-driving of the DC-DC converter 25 and the inverter 26. A voltage conversion ratio in the DC-DC converter 25 is controlled by switch-driving of the DC-DC converter 25, whereby an output voltage (an input voltage of the inverter 26) VH of the DC-DC converter 25 is controlled and a voltage VH which is applied to the coil of the motor generator 14 through the inverter 26 is controlled. In the following description, the voltage VH is referred to as a system voltage. In addition, switch-driving of the inverter 26 is controlled, whereby the operation state of the motor generator 14 is controlled.

Figure 2:
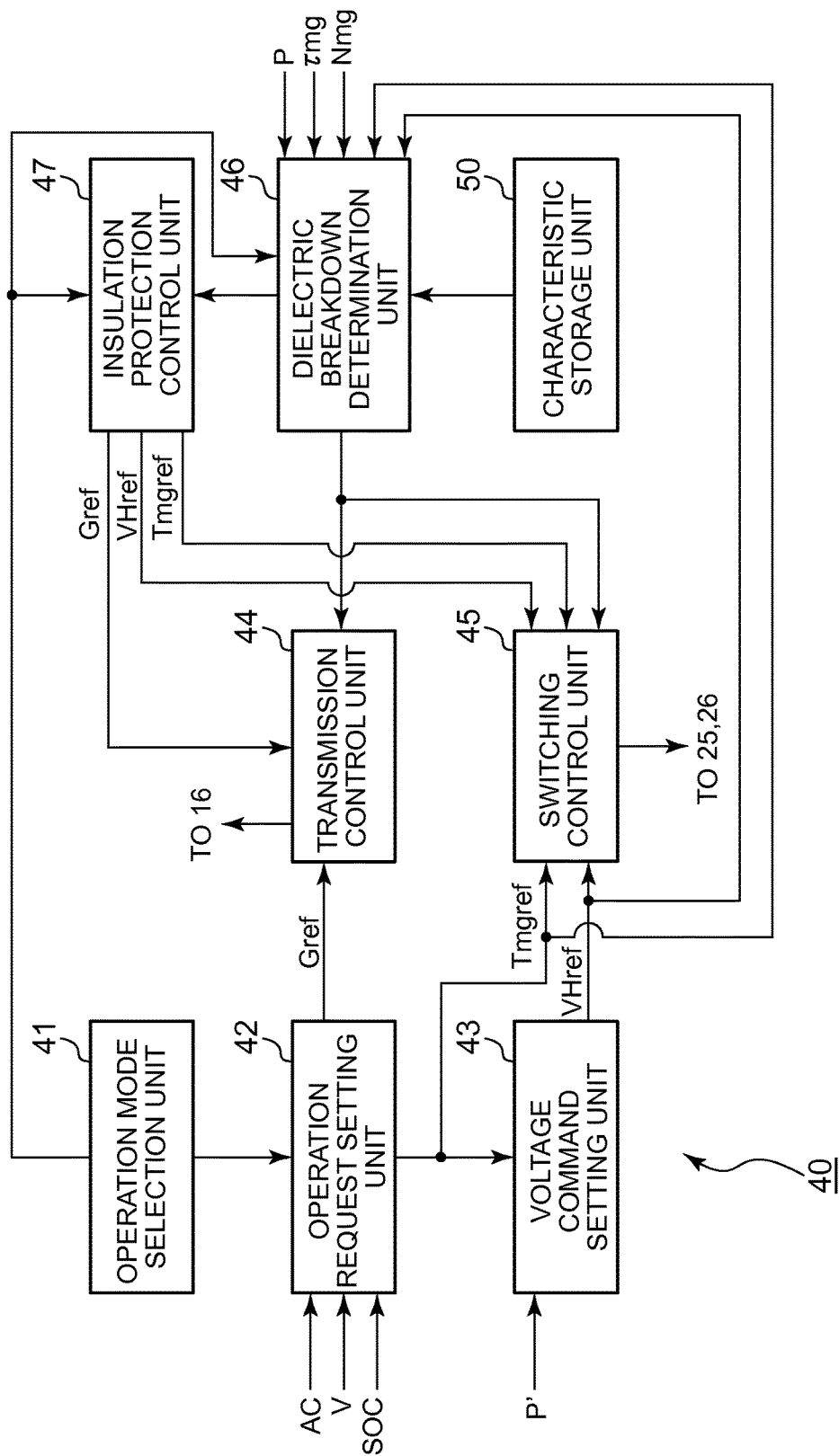
FIG. 2 is a functional block diagram showing a configuration example of an electronic control device.

An example of a functional diagram of the electronic control device 40 is shown in FIG. 2. An operation mode selection unit 41 receives an operation input from a driver of the vehicle and selects the operation mode of the engine 12 and the motor generator 14. As the operation mode, a normal mode, a power mode in which the engine 12 and the motor generator 14 are operated such that a vehicle drive force is increased more than the normal mode, and an economy mode in which the engine 12 and the motor generator 14 are operated such that energy consumption at the time of driving of the vehicle is decreased more than the normal mode can be selected.

Figure 3:
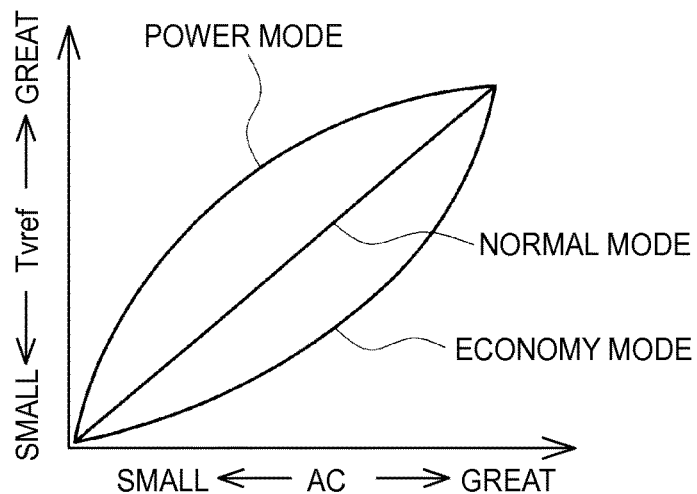
FIG. 3 is a diagram showing an example of a characteristic of a vehicle requested drive force Tvref with respect to an accelerator opening AC.

An operation request setting unit 42 sets a requested shift gear stage (requested transmission gear ratio Gref) of the transmission 16, requested torque Teref of the engine 12, and requested torque Tmgref of the motor generator 14 based on the operation mode selected by the operation mode selection unit 41, the accelerator opening AC, the vehicle speed V, and a remaining capacity SOC of the electrical storage device 24. A value detected by the accelerator opening sensor 61 is used for the accelerator opening AC, a value detected by the vehicle speed sensor 62 is used for the vehicle speed V, and the remaining capacity SOC of the electrical storage device 24 can be calculated from, for example, the current and the voltage of the electrical storage device 24. Here, a vehicle requested drive force Tvref is set based on the selected operation mode and the accelerator opening AC, and the drive force distribution of the engine 12 and the motor generator 14 is set based on the remaining capacity SOC of the electrical storage device 24. At this time, for example, as shown in FIG. 3, the characteristic of the vehicle requested drive force Tvref to the accelerator opening AC is different in the normal mode, the power mode, and the economy mode. In the power mode, the vehicle requested drive force Tvref to the same accelerator opening AC is greater than the normal mode. In the economy mode, the vehicle requested drive force Tvref to the accelerator opening AC is small such that energy consumption at the time of driving of the vehicle is decreased more than the normal mode. Then, the requested shift gear stage of the transmission 16, requested torque Teref of the engine 12, and requested torque Tmgref of the motor generator 14 are determined based on the set vehicle requested drive force Tvref, the drive force distribution, and the vehicle speed V. The efficiency of the engine 12 changes depending on the rotation speed and torque of the engine 12, and the efficiency of the motor generator 14 changes according to the rotation speed and torque of the motor generator 14. Therefore, the requested shift gear stage of the transmission 16 is selected such that the efficiency of the whole of the engine 12 and the motor generator 14 is the highest, and requested torque Teref of the engine 12 and requested torque Tmgref of the motor generator 14 are determined.

A voltage command setting unit 43 sets a command value VHref of the system voltage (the application voltage to the coil of the motor generator 14 through the inverter 26) based on requested torque Tmgref of the motor generator 14 set by the operation request setting unit 42 and the atmospheric pressure P. A value detected by the atmospheric pressure sensor 64 can be used for the atmospheric pressure P. Here, a system voltage command value VHref is set such that the motor generator 14 can generate torque equal to or greater than requested torque Tmgref. In addition, it is preferable to set the system voltage command value VHref in consideration of loss in the DC-DC converter 25.

A transmission control unit 44 controls the transmission gear ratio G of the transmission 16 such that the shift gear stage of the transmission 16 becomes the requested shift gear stage. A switching control unit 45 controls switch-driving of the DC-DC converter 25 such that the system voltage VH becomes the command value VHref, and controls switch-driving of the inverter 26 such that torque Tmg of the motor generator 14 becomes requested torque Tmgref.

In the motor generator 14, for example, discharging in an insulating part, such as short-circuiting between a coil and an iron core or short-circuiting between different-phase coils, so-called dielectric breakdown, may occur depending on operation conditions. Hereinafter, control for predicting and suppressing dielectric breakdown of the motor generator 14 will be described.

Figure 4:
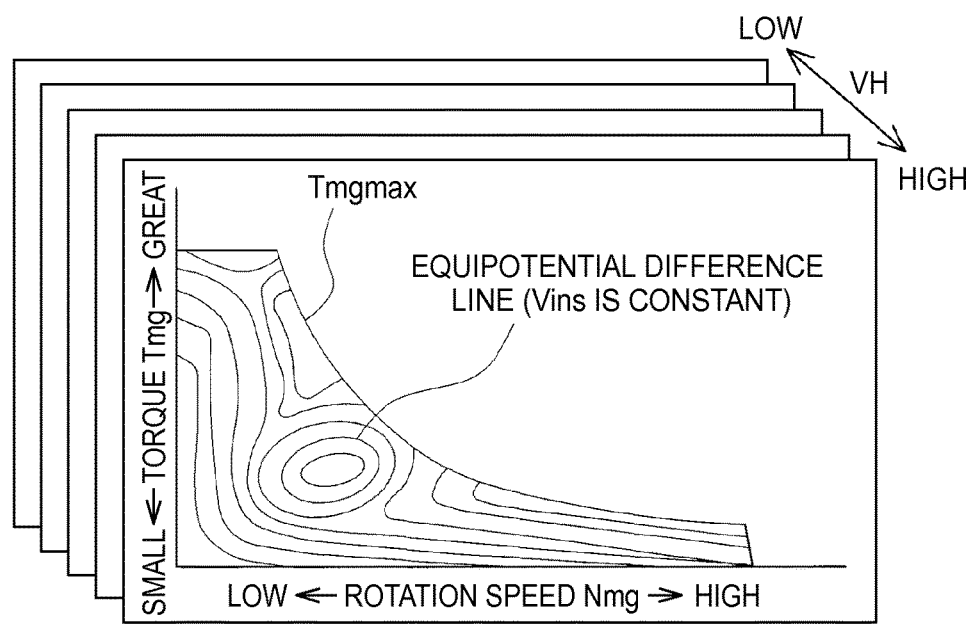
FIG. 4 is a diagram showing an example of a stress characteristic map at a certain system voltage VH.

In the motor generator 14, a potential difference Vins between insulating parts, such as a coil and an iron core or different-phase coils, changes according to the application voltage (system voltage) VH to the coil, the rotation speed Nmg, or torque Tmg. For example, if the application voltage VH to the coil is increased or a current Img of the coil is increased and torque Tmg is increased, the potential difference Vins between the insulating parts is likely to be increased. In addition, the potential difference Vins between the insulating parts may be increased due to the occurrence of resonance in a circuit including a coil depending on the condition of the rotation speed Nmg (the switching frequency of the inverter 26). If the potential difference Vins between the insulating parts is increased, discharging (dielectric breakdown) in an insulating part is likely to occur. Accordingly, in the motor generator 14, the potential difference (maximum value) Vins between the insulating parts is measured while changing the system voltage VH, the rotation speed Nmg, and torque Tmg, whereby a stress characteristic map representing the relationship of the potential difference (maximum value) Vins between the insulating parts to the system voltage VH, the rotation speed Nmg, and torque Tmg is created in advance and stored in a characteristic storage unit 50 of the electronic control device 40. An example of a stress characteristic map at a certain system voltage VH is shown in FIG. 4. In FIG. 4, operation points (rotation speed Nmg and torque Tmg) where the potential difference Vins between the insulating parts becomes equal are connected to set an equipotential difference line. Maximum torque Tmgmax which can be generated by the motor generator 14 at a certain rotation speed Nmg becomes smaller as the system voltage VH is lower.

Figure 5:
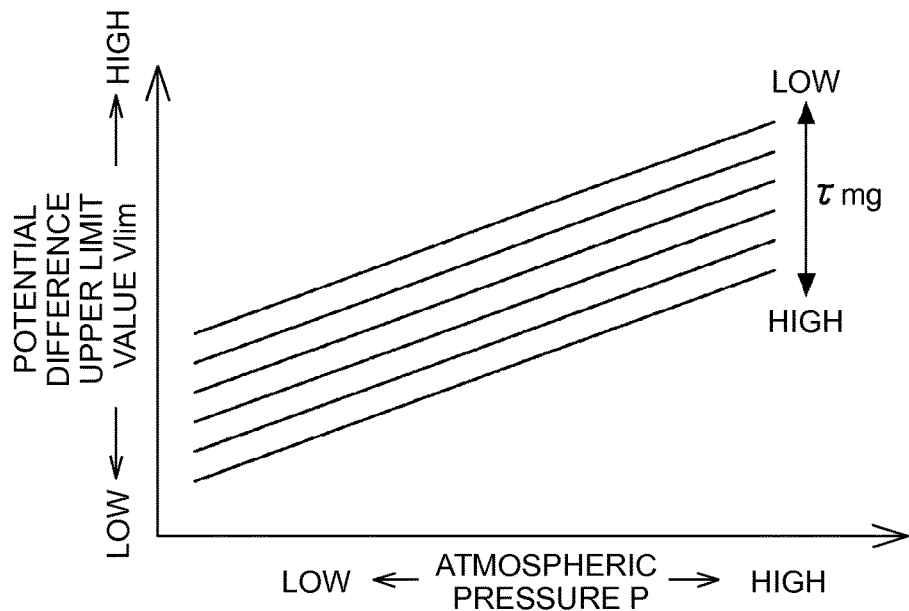
FIG. 5 is a diagram showing an example of a strength characteristic map.

An upper limit value Vlim of the potential difference at which discharging (dielectric breakdown) in an insulating part does not occur changes according to the temperature τmg or the atmospheric pressure P. For example, if the atmospheric pressure P becomes low or the temperature τmg becomes high, discharging is likely to occur. Accordingly, the upper limit value Vlim of the potential difference at which discharging does not occur is measured while changing the temperature τmg and the atmospheric pressure P, whereby a strength characteristic map representing the relationship of the upper limit value Vlim of the potential difference to the temperature τmg and the atmospheric pressure P is created in advance and stored in the characteristic storage unit 50 of the electronic control device 40. An example of a strength characteristic map is shown in FIG. 5. In the strength characteristic map of FIG. 5, the upper limit value Vlim of the potential difference is increased with an increase in the atmospheric pressure P, and the upper limit value Vlim of the potential difference is increased with a decrease in the temperature τmg.

A dielectric breakdown determination unit 46 determines the occurrence of dielectric breakdown of the motor generator 14 based on the application voltage (system voltage) VH to the motor generator 14 and the rotation speed Nmg and torque Tmg of the motor generator 14. As the system voltage VH, the system voltage command value VHref can be used or a value detected by a voltage sensor can be used. As the rotation speed Nmg of the motor generator 14, a value calculated from the vehicle speed V and the transmission gear ratio G of the transmission 16 can be used or a value detected by the rotation speed sensor can be used. As torque Tmg of the motor generator 14, requested torque Tmgref can be used or a value calculated from the current Img of the coil can be used. The dielectric breakdown determination unit 46 estimates the potential difference Vins between the insulating parts of the motor generator 14 based on the system voltage VH, the rotation speed Nmg, and torque Tmg. At this time, in the stress characteristic map stored in the characteristic storage unit 50, the potential difference Vins between the insulating parts corresponding to the given system voltage VH, the rotation speed Nmg, and torque Tmg is calculated. In addition, the dielectric breakdown determination unit 46 estimates the upper limit value Vlim of the potential difference, at which discharging in an insulating part does not occur, based on the atmospheric pressure P around the motor generator 14 and the temperature τmg of the motor generator 14. A value detected by the atmospheric pressure sensor 64 can be used for the atmospheric pressure P, and a value detected by the temperature sensor 63 can be used for the temperature τmg. At this time, in the strength characteristic map stored in the characteristic storage unit 50, the upper limit value Vlim of the potential difference corresponding to the given atmospheric pressure P and the temperature τmg is calculated. Then, the dielectric breakdown determination unit 46 compares the potential difference Vins between the insulating parts with the upper limit value (set value) Vlim to determine whether or not dielectric breakdown occurs in the motor generator 14. For example, when the potential difference Vins between the insulating parts is equal to or less than the upper limit value Vlim, it is determined that dielectric breakdown does not occur. When the potential difference Vins between the insulating parts is greater than the upper limit value Vlim, it is determined that dielectric breakdown occurs. An insulation protection control unit 47 executes insulation protection control for suppressing dielectric breakdown of the motor generator 14 when the dielectric breakdown determination unit 46 determines that dielectric breakdown occurs.

Here, if the application voltage (system voltage) VH to the motor generator 14 is decreased, the potential difference Vins between the insulating parts of the motor generator 14 is decreased. If the system voltage VH is decreased, and the potential difference Vins between the insulating parts is equal to or less than the upper limit value Vlim, it is possible to suppress dielectric breakdown of the motor generator 14. However, if the system voltage VH is decreased, since the maximum torque Tmgmax which can be generated by the motor generator 14 is decreased, power performance of the vehicle is degraded. In particular, it is undesirable that power performance of the vehicle is degraded in the power mode in which power performance of the vehicle is given priority.

Figure 6:
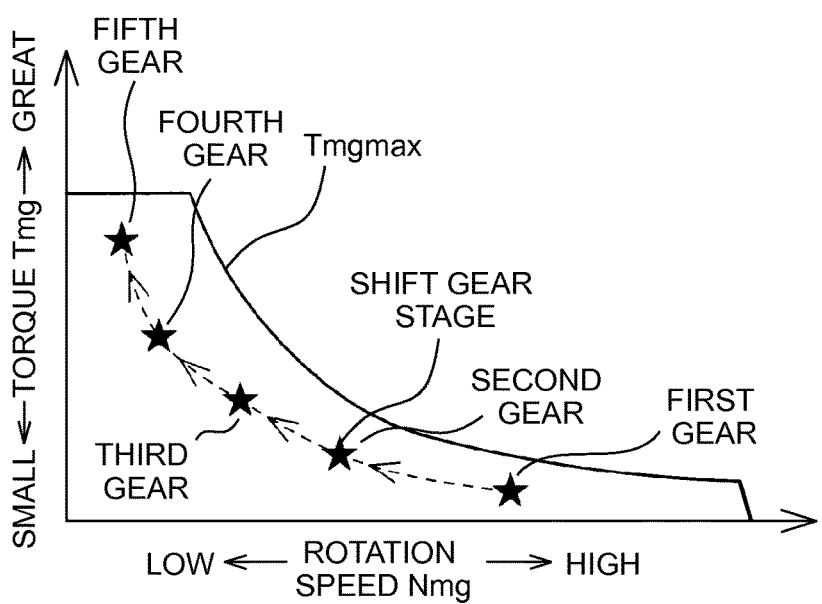
FIG. 6 is a diagram showing a state where a rotation speed Nmg and torque Tmg of a motor generator are changed with a change in a shift gear stage of a transmission.

If the shift gear stage of the transmission 16 (transmission gear ratio G) is changed, for example, as shown in FIG. 6, the rotation speed Nmg and torque Tmg of the motor generator 14 are changed, whereby the potential difference Vins between the insulating parts of the motor generator 14 is changed. If the transmission gear ratio G of the transmission 16 is changed, and the potential difference Vins between the insulating parts is equal to or less than the upper limit value Vlim, it is possible to suppress dielectric breakdown of the motor generator 14. However, if the transmission gear ratio G of the transmission 16 is changed, since the operation state of the motor generator 14 and the engine 12 is deviated from a high efficiency state, efficiency at the time of driving of the vehicle is degraded. In particular, it is undesirable that efficiency at the time of driving of the vehicle is degraded in the economy mode in which fuel efficiency of the vehicle is given priority.

In this embodiment, the insulation protection control unit 47 changes a method for the insulation protection control of the motor generator 14 according to the operation mode selected by the operation mode selection unit 41. Hereinafter, a method for the insulation protection control in each operation mode will be described.

Figure 7:
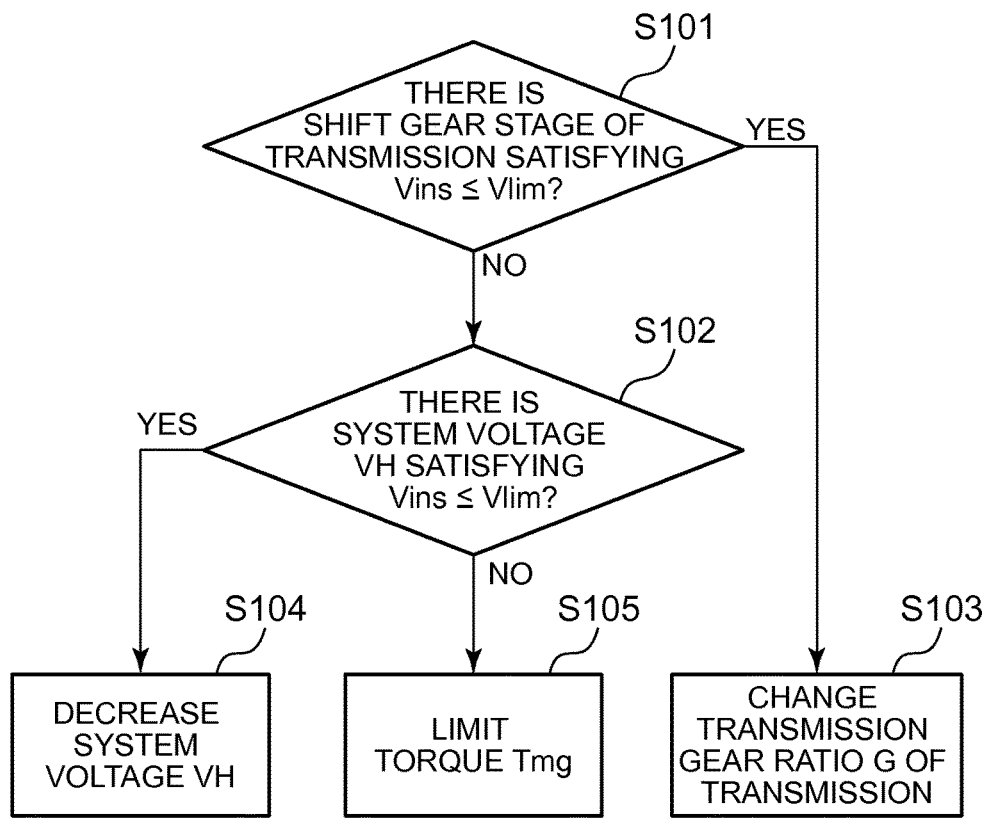
FIG. 7 is a flowchart illustrating processing which is executed by the electronic control device when it is determined that dielectric breakdown occurs in a state where a power mode is selected.

When the dielectric breakdown determination unit 46 determines that dielectric breakdown occurs in a state where the power mode is selected as the operation mode, the electronic control device 40 executes processing shown in the flowchart of FIG. 7. In Step S101, the dielectric breakdown determination unit 46 determines whether or not there is a shift gear stage of the transmission 16 (transmission gear ratio G) where the potential difference Vins between the insulating parts is equal to or less than the upper limit value Vlim. The rotation speed Nmg and requested torque Tmgref of the motor generator 14 corresponding to each shift gear stage are calculated based on the vehicle requested drive force Tvref, the drive force distribution, and the vehicle speed V. Next, in the stress characteristic map, the potential difference Vins between the insulating parts corresponding to the calculated rotation speed Nmg, requested torque Tmgref, and the system voltage command value VHref is calculated for each shift gear stage. Then, it is determined whether or not the calculated potential difference Vins between the insulating parts is equal to or less than the upper limit value Vlim for each shift gear stage. When there is at least one shift gear stage of the transmission 16 where the potential difference Vins between the insulating parts is equal to or less than the upper limit value Vlim (when the determination result of Step S101 is YES), it is determined that the occurrence of dielectric breakdown is prevented by a change in the transmission gear ratio G of the transmission 16, and the process progresses to Step S103. When the potential difference Vins between the insulating parts is greater than the upper limit value Vlim in all shift gear stages (when the determination result of Step S101 is NO), it is determined that dielectric breakdown occurs even if the transmission gear ratio G of the transmission 16 is changed, and the process progresses to Step S102.

In Step S102, the dielectric breakdown determination unit 46 determines whether or not there is the system voltage VH at which the potential difference Vins between the insulating parts is equal to or less than the upper limit value Vlim within a range in which the motor generator 14 can generate requested torque Tmgref. At this time, the rotation speed Nmg and requested torque Tmgref are set corresponding to a shift gear stage where the potential difference Vins between the insulating parts is minimized in Step S101. Here, while decreasing the system voltage command value VHref within the range in which the motor generator 14 can generate requested torque Tmgref, in the stress characteristic map, the potential difference Vins between the insulating parts corresponding to the system voltage command value VHref, the rotation speed Nmg, and requested torque Tmgref is calculated for each system voltage command value VHref. Then, it is determined whether or not the calculated potential difference Vins between the insulating parts is equal to or less than the upper limit value Vlim for each system voltage command value VHref. When the system voltage command value VHref is decreased within the range in which the motor generator 14 can generate requested torque Tmgref, and when the potential difference Vins between the insulating parts is equal to or less than the upper limit value Vlim (when the determination result of Step S102 is YES), it is determined that the occurrence of dielectric breakdown is prevented by a decrease in the system voltage VH, and the process progresses to Step S104. When the potential difference Vins between the insulating parts becomes greater than the upper limit value Vlim even if the system voltage command value VHref is decreased within the range in which the motor generator 14 can generate requested torque Tmgref (when the determination result of Step S102 is NO), it is determined that dielectric breakdown occurs even if the system voltage VH is decreased, and the process progresses to Step S105.

In Step S103, the insulation protection control unit 47 selects a method of changing the transmission gear ratio G of the transmission 16 as the insulation protection control. Here, the shift gear stage (transmission gear ratio G) where the potential difference Vins between the insulating parts is equal to or less than the upper limit value Vlim is set as the requested shift gear stage (requested transmission gear ratio Gref) of the transmission 16, and requested torque Tmgref is set corresponding to the requested transmission gear ratio Gref. When there are a plurality of shift gear stages where the potential difference Vins between the insulating parts is equal to or less than the upper limit value Vlim, for example, a shift gear stage where the potential difference Vins between the insulating parts is minimized can be selected as the requested shift gear stage of the transmission 16. Alternatively, a shift gear stage where the efficiency of the whole of the engine 12 and the motor generator 14 is the highest among a plurality of shift gear stages where the potential difference Vins between the insulating parts is equal to or less than the upper limit value Vlim can be selected as the requested shift gear stage of the transmission 16. The transmission control unit 44 performs control such that the transmission gear ratio G of the transmission 16 becomes the requested transmission gear ratio Gref set by the insulation protection control unit 47. Accordingly, dielectric breakdown is suppressed by making the potential difference Vins between the insulating parts equal to or less than the upper limit value Vlim. The switching control unit 45 performs control such that the system voltage VH becomes the command value VHref set by the voltage command setting unit 43, and performs control such that torque Tmg of the motor generator 14 becomes requested torque Tmgref set by the insulation protection control unit 47.

In Step S104, the insulation protection control unit 47 selects a method of decreasing the system voltage VH as the insulation protection control. Here, the system voltage VH at which the potential difference Vins between the insulating parts is equal to or less than the upper limit value Vlim within the range in which the motor generator 14 can generate requested torque Tmgref is set as the system voltage command value VHref. At this time, the transmission gear ratio G at which the potential difference Vins between the insulating parts is minimized in Step S101 is set as the requested transmission gear ratio Gref of the transmission 16, and requested torque Tmgref is set corresponding to the requested transmission gear ratio Gref. The transmission control unit 44 performs control such that the transmission gear ratio G of the transmission 16 becomes the requested transmission gear ratio Gref set by the insulation protection control unit 47. The switching control unit 45 performs control such that the system voltage VH becomes the command value VHref set by the insulation protection control unit 47, and performs control such that torque Tmg of the motor generator 14 becomes requested torque Tmgref set by the insulation protection control unit 47. Accordingly, dielectric breakdown is suppressed by making the potential difference Vins between the insulating parts equal to or less than the upper limit value Vlim.

In Step S105, the insulation protection control unit 47 selects a method of limiting torque Tmg of the motor generator 14 as the insulation protection control. Here, the system voltage command value VHref is decreased until the potential difference Vins between the insulating parts is equal to or less than the upper limit value Vlim. At this time, the transmission gear ratio G at which the potential difference Vins between the insulating parts is minimized in Step S101 is set as the requested transmission gear ratio Gref of the transmission 16. The transmission control unit 44 performs control such that the transmission gear ratio G of the transmission 16 becomes the requested transmission gear ratio Gref set by the insulation protection control unit 47. The switching control unit 45 performs control such that the system voltage VH becomes the command value VHref set by the insulation protection control unit 47. Accordingly, dielectric breakdown is suppressed by making the potential difference Vins between the insulating parts equal to or less than the upper limit value Vlim. However, torque Tmg of the motor generator 14 is limited to be equal to or less than the maximum torque Tmgmax according to the system voltage VH, and becomes smaller than requested torque Tmgref set based on the vehicle requested drive force Tvref and the requested transmission gear ratio Gref.

Figure 8:
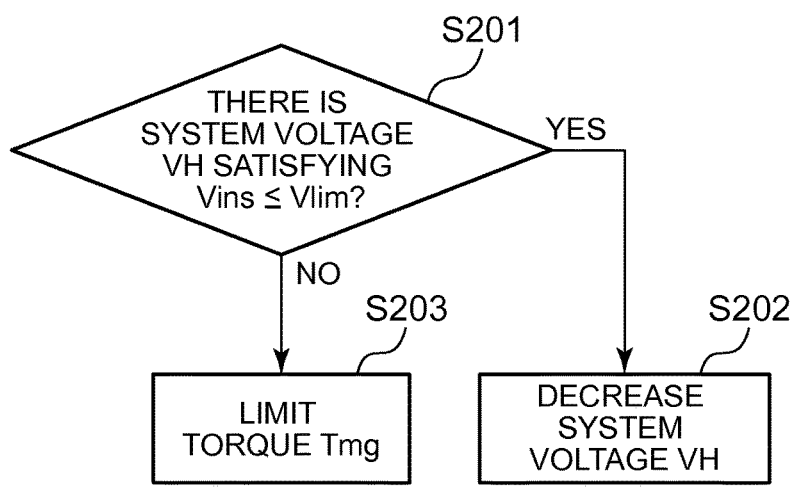
FIG. 8 is a flowchart illustrating processing which is executed by the electronic control device when it is determined that dielectric breakdown occurs in a state where an economy mode is selected.

When the dielectric breakdown determination unit 46 determines that dielectric breakdown occurs in a state where the economy mode is selected as the operation mode, the electronic control device 40 executes processing shown in the flowchart of FIG. 8. In Step S201, the dielectric breakdown determination unit 46 determines whether or not there is the system voltage VH at which the potential difference Vins between the insulating parts is equal to or less than the upper limit value Vlim within the range in which the motor generator 14 can generate requested torque Tmgref. Here, while decreasing the system voltage command value VHref within the range in which the motor generator 14 can generate requested torque Tmgref set by the operation request setting unit 42, in the stress characteristic map, the potential difference Vins between the insulating parts corresponding to the system voltage command value VHref, the rotation speed Nmg, and requested torque Tmgref is calculated for each system voltage command value VHref. Then, it is determined whether or not the calculated potential difference Vins between the insulating parts is equal to or less than the upper limit value Vlim for each system voltage command value VHref. When the determination result of Step S201 is YES, it is determined that the occurrence of dielectric breakdown is prevented by a decrease in the system voltage VH, and the process progresses to Step S202. When the determination result of Step S201 is NO, it is determined that dielectric breakdown occurs even if the system voltage VH is decreased, and the process progresses to Step S203.

In Step S202, the insulation protection control unit 47 selects a method of decreasing the system voltage VH as the insulation protection control. Here, the system voltage VH at which the potential difference Vins between the insulating parts is equal to or less than the upper limit value Vlim within the range in which the motor generator 14 can generate requested torque Tmgref is set as the system voltage command value VHref. The transmission control unit 44 performs control such that the transmission gear ratio G of the transmission 16 becomes the requested transmission gear ratio Gref set by the operation request setting unit 42. The switching control unit 45 performs control such that the system voltage VH becomes the command value VHref set by the insulation protection control unit 47, and performs control such that torque Tmg of the motor generator 14 becomes requested torque Tmgref set by the operation request setting unit 42. Accordingly, dielectric breakdown is suppressed by making the potential difference Vins between the insulating parts equal to or less than the upper limit value Vlim.

In Step S203, the insulation protection control unit 47 selects a method of limiting torque Tmg of the motor generator 14 as the insulation protection control. Here, the system voltage command value VHref is decreased until the potential difference Vins between the insulating parts is equal to or less than the upper limit value Vlim. The transmission control unit 44 performs control such that the transmission gear ratio G of the transmission 16 becomes the requested transmission gear ratio Gref set by the operation request setting unit 42. The switching control unit 45 performs control such that the system voltage VH becomes the command value VHref set by the insulation protection control unit 47. Accordingly, dielectric breakdown is suppressed by making the potential difference Vins between the insulating parts equal to or less than the upper limit value Vlim. However, torque Tmg of the motor generator 14 is limited to be equal to or less than the maximum torque Tmgmax according to the system voltage VH, and becomes smaller than requested torque Tmgref set by the operation request setting unit 42.

When the dielectric breakdown determination unit 46 determines that dielectric breakdown occurs in a state where the normal mode is selected as the operation mode, the electronic control device 40 executes processing shown in the flowchart of FIG. 9. In Step S301, similarly to Step S201, the dielectric breakdown determination unit 46 determines whether or not there is the system voltage VH at which the potential difference Vins between the insulating parts is equal to or less than the upper limit value Vlim within a range in which the motor generator 14 can generate requested torque Tmgref. When the determination result of Step S301 is YES, it is determined that the occurrence of dielectric breakdown is prevented by a decrease in the system voltage VH, and the process progresses to Step S303. When the determination result of Step S301 is NO, it is determined that dielectric breakdown occurs even if the system voltage VH is decreased, and the process progresses to Step S302.

In Step S302, similarly to Step S101, the dielectric breakdown determination unit 46 determines whether or not there is a shift gear stage of the transmission 16 where the potential difference Vins between the insulating parts is equal to or less than the upper limit value Vlim. At this time, the system voltage command value VHref may be decreased within the range in which the motor generator 14 can generate requested torque Tmgref. When the determination result of Step S302 is YES, it is determined that the occurrence of dielectric breakdown is prevented by a change in the transmission gear ratio G of the transmission 16, and the process progresses to Step S304. When the determination result of Step S302 is NO, it is determined that dielectric breakdown occurs even if the transmission gear ratio G of the transmission 16 is changed, and the process progresses to Step S305.

In Step S303, the insulation protection control unit 47 selects a method of decreasing the system voltage VH as the insulation protection control. Here, the system voltage VH at which the potential difference Vins between the insulating parts is equal to or less than the upper limit value Vlim within the range in which the motor generator 14 can generate requested torque Tmgref is set as the system voltage command value VHref. The transmission control unit 44 performs control such that the transmission gear ratio G of the transmission 16 becomes the requested transmission gear ratio Gref set by the operation request setting unit 42. The switching control unit 45 performs control such that the system voltage VH becomes the command value VHref set by the insulation protection control unit 47, and performs control such that torque Tmg of the motor generator 14 becomes requested torque Tmgref set by the operation request setting unit 42. Accordingly, dielectric breakdown is suppressed by making the potential difference Vins between the insulating parts equal to or less than the upper limit value Vlim.

In Step S304, the insulation protection control unit 47 selects a method of changing the transmission gear ratio G of the transmission 16 as the insulation protection control. Here, a shift gear stage where the potential difference Vins between the insulating parts is equal to or less than the upper limit value Vlim is set as the requested shift gear stage of the transmission 16, and requested torque Tmgref is set corresponding to the requested transmission gear ratio Gref. At this time, the system voltage command value VHref may be decreased within the range in which the motor generator 14 can generate requested torque Tmgref. The transmission control unit 44 performs control such that the transmission gear ratio G of the transmission 16 becomes the requested transmission gear ratio Gref set by the insulation protection control unit 47. Accordingly, dielectric breakdown is suppressed by making the potential difference Vins between the insulating parts equal to or less than the upper limit value Vlim. The switching control unit 45 performs control such that the system voltage VH becomes the command value VHref set by the insulation protection control unit 47, and performs control such that torque Tmg of the motor generator 14 becomes requested torque Tmgref set by the insulation protection control unit 47.

In Step S305, the insulation protection control unit 47 selects a method of limiting torque Tmg of the motor generator 14 as the insulation protection control. Here, the system voltage command value VHref is decreased until the potential difference Vins between the insulating parts is equal to or less than the upper limit value Vlim. At this time, the transmission gear ratio G at which the potential difference Vins between the insulating parts is minimized in Step S302 is set as the requested transmission gear ratio Gref of the transmission 16. The transmission control unit 44 performs control such that the transmission gear ratio G of the transmission 16 becomes the requested transmission gear ratio Gref set by the insulation protection control unit 47. The switching control unit 45 performs control such that the system voltage VH becomes the command value VHref set by the insulation protection control unit 47. Accordingly, dielectric breakdown is suppressed by making the potential difference Vins between the insulating parts equal to or less than the upper limit value Vlim. However, torque Tmg of the motor generator 14 is limited to be equal to or less than the maximum torque Tmgmax according to the system voltage VH, and becomes smaller than requested torque Tmgref set based on the vehicle requested drive force Tvref and the requested transmission gear ratio Gref.

When the dielectric breakdown determination unit 46 determines that dielectric breakdown does not occur, the transmission control unit 44 performs control such that the transmission gear ratio G of the transmission 16 becomes the requested transmission gear ratio Gref set by the operation request setting unit 42. Then, the switching control unit 45 performs control such that torque Tmg of the motor generator 14 becomes requested torque Tmgref set by the operation request setting unit 42, and performs control such that the system voltage VH becomes the command value VHref set by the voltage command setting unit 43.

According to the processing in the flowchart of FIG. 7, at the time of executing the insulation protection control in a state where the power mode is selected, when the dielectric breakdown determination unit 46 determines that the occurrence of dielectric breakdown is prevented by a change in the transmission gear ratio G of the transmission 16, the insulation protection control unit 47 selects the method of changing the transmission gear ratio G of the transmission 16 as the insulation protection control. When the dielectric breakdown determination unit 46 determines that dielectric breakdown occurs even if the transmission gear ratio G of the transmission 16 is changed and the occurrence of dielectric breakdown is prevented by a decrease in the application voltage (system voltage) VH to the motor generator 14, the insulation protection control unit 47 selects the method of decreasing the system voltage VH as the insulation protection control. When the dielectric breakdown determination unit 46 determines that dielectric breakdown occurs even if the system voltage VH is decreased, the insulation protection control unit 47 selects the method of limiting torque Tmg of the motor generator 14 as the insulation protection control. That is, in the insulation protection control unit 47, the priority of the insulation protection control in a state where the power mode is selected is set in the order of a change in the transmission gear ratio G of the transmission 16, a decrease in the application voltage (system voltage) VH to the motor generator 14, and torque limitation of the motor generator 14. In this way, in the power mode in which power performance of the vehicle is given priority, the insulation protection control by a change in the transmission gear ratio G is performed with priority over the insulation protection control by a decrease in the system voltage VH, whereby it is possible to suppress dielectric breakdown of the motor generator 14 and to perform component protection while suppressing degradation of power performance of the vehicle as much as possible.

According to the processing in the flowchart of FIG. 8, at the time of executing the insulation protection control in a state where the economy mode is selected, when the dielectric breakdown determination unit 46 determines that the occurrence of dielectric breakdown is prevented by a decrease in the application voltage (system voltage) VH to the motor generator 14, the insulation protection control unit 47 selects the method of decreasing the system voltage VH as the insulation protection control. When the dielectric breakdown determination unit 46 determines that dielectric breakdown occurs even if the system voltage VH is decreased, the insulation protection control unit 47 selects the method of limiting torque Tmg of the motor generator 14 as the insulation protection control. That is, in the insulation protection control unit 47, the priority of the insulation protection control in a state where the economy mode is selected is set in the order of a decrease in the application voltage (system voltage) VH to the motor generator 14 and torque limitation of the motor generator 14. In this way, in the economy mode in which fuel efficiency of the vehicle is given priority, the insulation protection control by a change in the transmission gear ratio G of the transmission 16 is not performed, whereby it is possible to maintain the operation state of the motor generator 14 and the engine 12 in a high efficiency state and to prevent degradation of efficiency at the time of driving of the vehicle. Then, the insulation protection control is performed by a decrease in the system voltage VH, whereby it is possible to suppress dielectric breakdown of the motor generator 14 while suppressing degradation of fuel efficiency of the vehicle.

According to the processing in the flowchart of FIG. 9, at the time of executing the insulation protection control in a state where the normal mode is selected, when the dielectric breakdown determination unit 46 determines that the occurrence of dielectric breakdown is prevented by a decrease in the application voltage (system voltage) VH to the motor generator 14, the insulation protection control unit 47 selects the method of decreasing the system voltage VH as the insulation protection control. When the dielectric breakdown determination unit 46 determines that dielectric breakdown occurs even if the system voltage VH is decreased, and the occurrence of dielectric breakdown is prevented by a change in the transmission gear ratio G of the transmission 16, the insulation protection control unit 47 selects the method of changing the transmission gear ratio G of the transmission 16 as the insulation protection control. When the dielectric breakdown determination unit 46 determines that dielectric breakdown occurs even if the transmission gear ratio G of the transmission 16 is changed, the insulation protection control unit 47 selects the method of limiting torque Tmg of the motor generator 14 as the insulation protection control. That is, in the insulation protection control unit 47, the priority of the insulation protection control in a state where the normal mode is selected is set in the order of a decrease in the application voltage (system voltage) VH to the motor generator 14, a change in the transmission gear ratio G of the transmission 16, and torque limitation of the motor generator 14. In this way, in the normal mode, the insulation protection control by a decrease in the system voltage VH is performed with priority over the insulation protection control by a change in the transmission gear ratio G, whereby it is possible to suppress dielectric breakdown of the motor generator 14 while suppressing degradation of fuel efficiency of the vehicle as much as possible.

Therefore, according to this embodiment described above, it is possible to suppress dielectric breakdown of the motor generator 14 while suppressing degradation of vehicle performance required in each operation mode as much as possible.

In this embodiment, it is possible to measure the potential difference Vins between the insulating parts of the motor generator 14 based on the system voltage VH and the rotation speed Nmg and torque Tmg of the motor generator 14 according to the operation conditions of the motor generator 14 with high accuracy. In addition, it is possible to measure the upper limit value Vlim of the potential difference, at which discharging in an insulating part does not occur, based on the atmospheric pressure P around the motor generator 14 and the temperature τmg of the motor generator 14 according to the environmental conditions of the motor generator 14 with high accuracy. Then, the potential difference Vins between the insulating parts is compared with the upper limit value Vlim, whereby it is possible to predict the occurrence of dielectric breakdown of the motor generator 14 according to the operation conditions or the environmental conditions of the motor generator 14 with high accuracy.

A vehicle to which the invention can be applied is not limited to a hybrid vehicle having the configuration shown in FIG. 1. For example, the invention can be applied to an electric vehicle in which the engine 12 is omitted, and power of the motor generator 14 can be transmitted to the driving wheels 18 by the shift of the transmission 16. In this way, the invention can be applied to any vehicles as long as power of the rotating electrical machine can be transmitted to the driving wheels by the shift of the transmission.

Although the mode for carrying out the invention has been described, the invention is not limited to the embodiment, and may be carried out in various modes without departing from the scope and spirit of the invention.

What is claimed is:

1. A control device for a vehicle capable of transmitting power of a rotating electrical machine to a driving wheel through a transmission, the control device comprising:
  an electronic control unit configured to:
  (i) select, as an operation mode of the rotating electrical machine at a time of driving of the vehicle based on a user input, one of a normal mode and a power mode in which the rotating electrical machine is operated such that a vehicle drive force in the power mode is increased from a vehicle drive force in the normal mode,
  (ii) execute insulation protection control of the rotating electrical machine when the electronic control unit determines that dielectric breakdown of the rotating electrical machine has occurred, and
  (iii) set a priority order of the insulation protection control in an order of a change in a transmission gear ratio of the transmission, a decrease in an application voltage to the rotating electrical machine, and torque limitation of the rotating electrical machine in a state where the power mode is selected as the operation mode,
  wherein the electronic control unit is configured to determine an occurrence of the dielectric breakdown of the rotating electrical machine based on the application voltage to the rotating electrical machine and a rotation speed and torque of the rotating electrical machine.

2. The control device according to claim 1,
  wherein, at a time of executing the insulation protection control in the state when the power mode is selected as the operation mode, the electronic control unit is configured to
  (i) change the transmission gear ratio of the transmission as the insulation protection control when the electronic control unit determines that an occurrence of dielectric breakdown is prevented by a change in the transmission gear ratio of the transmission,
  (ii) decrease the application voltage to the rotating electrical machine as the insulation protection control when the electronic control unit determines that dielectric breakdown has occurred even when the transmission gear ratio of the transmission is changed and the occurrence of dielectric breakdown is prevented by a decrease in the application voltage to the rotating electrical machine, and (iii) limit torque of the rotating electrical machine as the insulation protection control when the electronic control unit determines that dielectric breakdown has occurred even when the application voltage to the rotating electrical machine is decreased.

3. The control device according to claim 1,
wherein the electronic control unit is configured to further select, as the operation mode of the rotating electrical machine, an economy mode in which the rotating electrical machine is operated such that energy consumption at a time of driving of the vehicle in the economy mode is decreased from the energy consumption in the normal mode, and
set a priority order of the insulation protection control in an order of a decrease in the application voltage to the rotating electrical machine and torque limitation of the rotating electrical machine in a state where the economy mode is selected as the operation mode.

4. The control device according to claim 1,
wherein the electronic control unit is configured to
(i) estimate a potential difference between insulating parts of the rotating electrical machine based on the application voltage to the rotating electrical machine and the rotation speed and torque of the rotating electrical machine, and
(ii) compare the potential difference with a set value to determine whether or not dielectric breakdown occurs in the rotating electrical machine.

5. The control device according to claim 4,
wherein the electronic control unit is configured to set the set value based on an atmospheric pressure around the rotating electrical machine and a temperature of the rotating electrical machine.

* * * * *